US012170396B2

(12) United States Patent
Davis et al.

(10) Patent No.: US 12,170,396 B2
(45) Date of Patent: Dec. 17, 2024

(54) SYSTEMS AND METHODS FOR TOOL SIGNAL EXTENSION

(71) Applicant: Milwaukee Electric Tool Corporation, Brookfield, WI (US)

(72) Inventors: Anthony M. Davis, Brookfield, WI (US); Matthew Halenka, Brookfield, WI (US); Bo Chen, Brookfield, WI (US); Kegan Markwardt, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 184 days.

(21) Appl. No.: 17/723,971

(22) Filed: Apr. 19, 2022

(65) Prior Publication Data

US 2022/0336943 A1 Oct. 20, 2022

Related U.S. Application Data

(60) Provisional application No. 63/176,707, filed on Apr. 19, 2021.

(51) Int. Cl.

| | |
|---|---|
| ***H01Q 1/22*** | (2006.01) |
| ***H01Q 1/24*** | (2006.01) |
| ***H01Q 1/48*** | (2006.01) |

(52) U.S. Cl.

CPC ............... *H01Q 1/242* (2013.01); *H01Q 1/48* (2013.01); *H01Q 1/22* (2013.01)

(58) Field of Classification Search

CPC ............................. H01Q 1/22–24; H01Q 1/44

See application file for complete search history.

(56) References Cited

U.S. PATENT DOCUMENTS

| | | | | |
|---|---|---|---|---|
| 7,444,116 | B2 | 10/2008 | Ivanov et al. | |
| 7,477,161 | B2 | 1/2009 | Macpherson et al. | |
| 8,544,564 | B2 | 10/2013 | Moore et al. | |
| 8,554,154 | B1 * | 10/2013 | Everson | H01Q 1/24 455/562.1 |
| 8,587,414 | B2 | 11/2013 | Bandyopadhyay et al. | |
| 8,816,850 | B2 | 8/2014 | Bandyopadhyay et al. | |
| 9,315,973 | B2 * | 4/2016 | Varman | F16K 27/12 |
| 9,644,477 | B2 | 5/2017 | Moore et al. | |
| 9,760,853 | B2 | 9/2017 | Rose | |
| 9,878,428 | B2 | 1/2018 | Lehnert et al. | |
| 9,978,260 | B2 | 5/2018 | Lee et al. | |
| 10,482,760 | B2 | 11/2019 | Goepner | |
| 10,674,316 | B2 | 6/2020 | Schadow et al. | |
| 10,886,996 | B1 * | 1/2021 | Robu | H04B 7/0834 |
| 10,909,825 | B2 * | 2/2021 | Scalisi | H04R 1/028 |
| 11,179,075 | B2 * | 11/2021 | Meyer | A61B 5/14552 |

(Continued)

FOREIGN PATENT DOCUMENTS

| | | | |
|---|---|---|---|
| EP | 346061 | A1 | 3/2019 |
| EP | 3687024 | A1 | 7/2020 |

(Continued)

*Primary Examiner* — Hasan Islam

(74) *Attorney, Agent, or Firm* — Quarles & Brady LLP

(57) ABSTRACT

A tool is provided with a connector that can be configured to removably receive a corresponding connector of an extender having an antenna to electrically connect the extender to the tool. With the connector of the tool electrically connected to the connector of the extender, the controller can be configured to utilize the antenna.

5 Claims, 8 Drawing Sheets

(56) References Cited

U.S. PATENT DOCUMENTS

| | | | |
|---|---|---|---|
| 2018/0161890 | A1 | 6/2018 | Barezzani et al. |
| 2018/0240331 | A1 | 8/2018 | Lee et al. |
| 2019/0160646 | A1 | 5/2019 | Hoossainy et al. |

FOREIGN PATENT DOCUMENTS

| | | | |
|---|---|---|---|
| WO | 2013/014914 | A2 | 1/2013 |
| WO | 2021/030549 | A1 | 2/2021 |

* cited by examiner

SYSTEMS AND METHODS FOR TOOL SIGNAL EXTENSION

RELATED APPLICATIONS

This application claims priority to U.S. patent application No. 63/176,707 filed Apr. 19, 2021, and entitled, "Systems and Methods for Tool Signal Extension," which is hereby incorporated by reference in its entirety.

BACKGROUND

Work tools, such as cutting tools, allow operators to implement various functionalities on many different components (e.g., electrical wires, power cables, sheet metal, etc.). For example, some cutting tools can include a cutting head that is driven (e.g., hydraulically, or electrically) into a component, such as a power wire, to cut through the component.

SUMMARY

Some embodiments of the disclosure provide a tool with a body, an actuator that is configured to implement a functionality, a connector, and a controller coupled to the body of the tool. The electrical connector of the tool can be configured to removably receive a corresponding electrical connector of an extender having an antenna to electrically connect the extender to the tool. With the connector of the tool electrically connected to the connector of the extender, the controller can be configured to utilize the antenna.

Some embodiments of the disclosure provide a tool system including a body, a first antenna coupled to the body, a first connector coupled to the body, and a controller coupled to the body and being in communication with the first antenna. The tool system can include an extender including an electrical cable, a second antenna coupled to the electrical cable, and a second connector coupled to the electrical cable. The electrical cable can be electrically connected to the second antenna and the second connector. The first connector can be configured to mechanically couple with the second connector to electrically connect the extender to the tool. The controller can be configured to determine that the first connector is electrically connected to the second connector, and use the second antenna for wireless communication, based on the determination that the first connector is electrically connected to the second connector.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
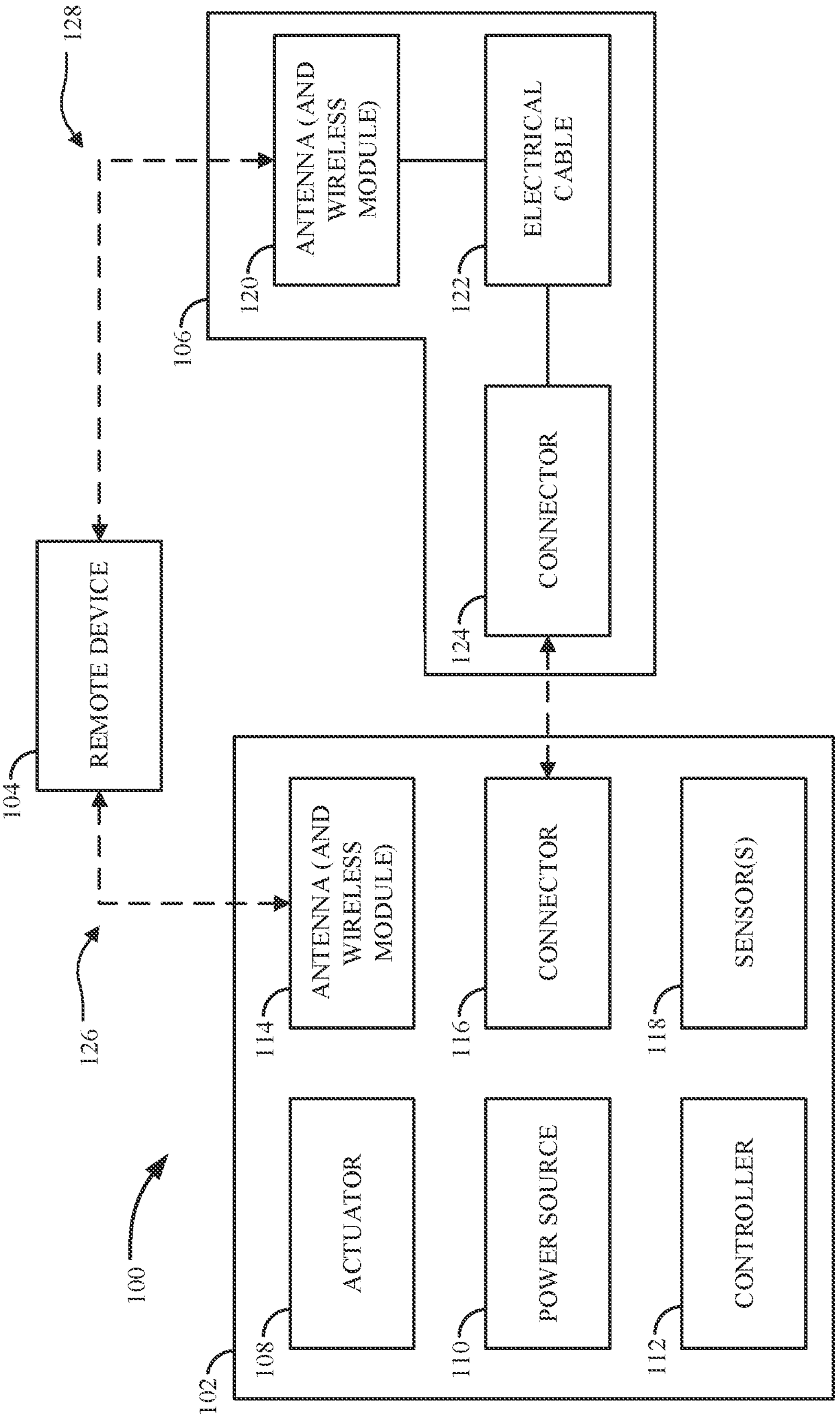
FIG. 1 is a schematic illustration of a tool system according to some embodiments of the invention.

As described above, work tools generally can implement various functionalities on different components. For example, work tools generally can include an actuator including a moveable component that when moved into contact with the component, implements some kind of functionality on the component. For example, such as when the work tool is implemented as a cutting tool, the actuator of the cutting tool can include a cutting head that can, when moved into contact with a work piece (e.g., a wire to be cut) sever the work piece in two. As another example, such as when the work tool is implemented as a crimping tool, the actuator of the crimping tool can include a crimping head that can, when moved into contact with a work piece (e.g., a wire to be crimped), crimp the work piece (e.g., to create an electrical connection to the wire).

Some work tools can include a controller that can control various features of the tool. For example, the controller can drive extension (or rotation) of the actuator to implement a functionality on a workpiece or can drive retraction (or rotation in the opposing direction) of the actuator (e.g., after the functionality has been completed). In some embodiments, the controller of the work tool can receive data from sensors of the work tool, which can augment the control of the actuator. For example, one sensor can be a trigger that is coupled to the work tool, which when actuated (e.g., by an operator), causes the actuator to extend to implement the functionality (e.g., via the controller). In this configuration, however, typically an operator is required to be present near the location of the work piece in order to implement the functionality on the work piece (e.g., by the operator actuating the trigger). However, in some scenarios, it is not desirable to have the operator be at the location of the work piece. For example, when an operator is cutting a power wire that could be live with a cutting tool, there could be risks associated with being near the power wire as it is being cut. As another example, the work piece may be situated in a location that is not easily accessible by the operator (e.g., short clearances), and thus, the operator may not be able to depress the trigger for the full duration required by the tool to implement the functionality on the work piece (e.g., cutting the wire).

Some embodiments of the invention provide solutions to these problems by providing improved systems and methods for signal extension of underground cutters or other tools. For example, some embodiments of the invention provide a tool system that includes a tool having an actuator configured to implement a functionality on a work piece, an extender (e.g., a wireless or wired extender), and a remote device for remotely controlling the tool. The tool can be implemented in different ways. For example, the tool can be a cutting tool, a punching tool, a crimping tool, a screwdriver, a rivet tool, a ratchet, a press tool, an expander tool, etc., with each tool having an actuator with a moveable component that is configured to implement at least one functionality on a work piece that the tool contacts. As a more specific example, the tool can be a cutting tool that has a cutting head that can cut a wire. As another specific example, the tool can be a crimping tool that has a crimping head that can crimp a wire.

The tool can be configured to communicate according to a Bluetooth® protocol with the remote device (e.g., a remote control), via the extender, which can extend the total communication range, so that an operator can instruct the tool to implement the tool functionality on the work piece at a greater distance (e.g., as compared to the direct communication distance between the tool to the remote device). For example, the Bluetooth® wireless protocol can provide advantages as compared to other wireless protocols, such as avoiding the need for other wireless infrastructures (e.g., cell towers, routers, servers, etc.), correspondingly using less power to communicate between devices (e.g., at least because there is no need to transmit to long range communication devices, such as cell towers), providing relatively fast communication speeds, and providing dependable assurance of one-to-one pairing between devices (e.g., that one master device is only controlling one slave device, at a time). However, the communication range between two devices using the Bluetooth® wireless protocol can be fairly limited. In addition, in some cases, the tool and the remote device must transmit signals through relatively dense materials (e.g., concrete, earth, etc.) that can significantly attenuate wireless signals (including Bluetooth® wireless signals). In fact, in some configurations, the tool can be situated within a hole (e.g., underground), a vault, etc., and the remote device can be situated above ground (and outside of the hole or vault). Thus, the only wireless communication path between these two devices is through dense materials that have relatively high RF attenuating properties.

As such, the inclusion of the extender can increase the total communication range between the remote device and the tool. For example, the antenna of the extender can be brought closer to the remote device, which can decrease (or eliminate) the distance the wireless signals have to travel through dense, attenuating, materials. In particular, the antenna can be placed above ground, along with the remote device, so that the communication path between these devices is largely unobstructed. In addition, with the extender providing a longer total communication range, the operator using the remote device has more freedom to position themselves at a location that is safe, comfortable, etc., while still being able to control the tool. In other words, by the inclusion of the extender, the operator is not reliant on the direct communication range between the remote device and the tool, which can not only allow for a greater total communication range between the remote device and the tool, but can also make establishing communication between the remote device and the tool easier (e.g., at least because the operator does not have to find a location that is within the direct communication range of the devices).

In some embodiments, the extender can include a battery (e.g., a rechargeable battery) that powers the extender. Since the extender has its own power source and the wireless extender may only be used for communication, the total allowable communication distance between the remote device and the tool via the wireless extender can be larger than a doubling of the direct communication range between the remote device and the tool. The wireless extender can partition a greater amount of power for generating a transmission signal, such as a higher amplitude signal, and can partition a greater amount of power for amplifying the signals received by the extender. In some cases, the antenna of the extender can be powered by the power source of the tool. In this way, with the extender electrically connected to the tool, the antenna of the extender can receive a greater amount of power from the power source of the tool for wireless signal transmission (e.g., a greater amplifying of signals received at and delivered to the antenna of the extender as compared to the amplification of signals received from or provided to the antenna located within the body of the tool).

Some embodiments of the invention provide another tool system that can similarly provide solutions to the problems described above. For example, this tool system can include a tool having two antennas, with one coupled to the tool (e.g., located within the body of the tool) and a second antenna in wired communication with the tool. In particular, the tool can include an electrical cable for wired communication that is removably coupled to the tool at one end and coupled to the second antenna at the other end. While both the first and second antennas can transmit and receive signals according to a Bluetooth® protocol, depending on a mode of operation, the tool can select which antenna to utilize during communication with a remote device (e.g., a remote control). For example, such as if the tool recognizes that the electrical cable is coupled to the tool, the tool can then utilize the second antenna for communication purposes. In this way, if an operator desires a greater communication range, the operator can interface the wire to the tool and unravel the wire to bring the second antenna closer to the remote control to extend the total communication range between the tool and the remote control. In some embodiments, the tool does not include an antenna coupled to the tool, except for the antenna of the extender. In this case, the tool can only utilize the antenna of the extender for wireless communication.

In some embodiments, such as when the extender includes an electrical cable (e.g., the extender implemented as a wired extender), the tool (e.g., the controller of the tool) can determine when to utilize the antenna of the extender for wireless communication (e.g., rather than the antenna coupled to or located within the body of the tool). For example, the tool and the extender can each have a connector that can be mechanically coupled together to electrically connect the extender (and thus the antenna of the extender) to the controller of the tool (e.g., via an electrical connection to a wireless module, which is in wired communication with the controller of the tool). With the connectors electrically connected together, a sensor of the tool can sense that the extender is connected to the tool, and thus, the controller of the tool can determine that the extender is electrically connected to the tool based on signals from the sensor. The controller of the tool can then selectively switch to utilize the antenna of the extender for wireless communication, rather than the antenna situated within the body of the tool, based on this determination (e.g., based on the signals from the sensor). In some embodiments, mating with the connectors electrically switches which antenna is utilized by the controller of the tool. For example, prior to mechanically connecting the connectors, the controller of the tool is electrically connected to a first antenna that is situated internally within the body of the tool so that the controller of the tool utilizes the first antenna for wireless communication. Then, after the connectors are mechanically connected together, an electrical connection between the controller of the tool and the first antenna is removed, and an electrical connection is created between a second antenna of the extender and the controller of the tool. Thus, while the connectors are mechanically connected, the controller of the tool automatically utilizes the second antenna of the extender for wireless communication.

FIG. 1 illustrates a tool system 100 according to some embodiments of the invention. The tool system 100 can include a tool 102, a remote device 104 configured to remotely control the tool 102, and an extender 106 configured to extend the communication range between the tool 102 and the remote device 104. The tool 102 can include an actuator 108 and a component that is moveable by the actuator 108. When the moveable component is moved by the actuator 108, the moveable component contacts a work piece and implements some kind of functionality on the work piece, or in other words, a tool operation on the work piece. The actuator 108 can be implemented in different ways. For example, the actuator 108 can be a linear actuator that can translate the moveable component or a rotational actuator that can pivot the moveable component. In some cases, the actuator 108 can be an electro-mechanical actuator (e.g., a linear actuator) that can electrically drive movement of the moveable component, while in other cases, the actuator 108 can be a hydraulic actuator that can hydraulically drive movement of the moveable component.

In one embodiment, the actuator 108 of the tool 102 can be electromechanically actuated. For example, the tool 102 can include an electric motor configured to cause a spindle to rotate, thus causing the actuator 108 coupled to the spindle to move linearly. In this embodiment, the actuator 108 can be coupled to the moveable component to linearly translate the moveable component. In other embodiments, the actuator 108 of the tool 102 can be hydraulically actuated. For example, the tool 102 can include a motor that drives a hydraulic pump, which pressurizes hydraulic fluid and provides the pressurized fluid to the actuator 108 (e.g., a linear hydraulic cylinder). A piston of the actuator 108 can be coupled to the moveable component to linearly translate the moveable component.

The moveable component of the tool 102 can be implemented in different ways in various embodiments. For example, the moveable component can include a tool head (e.g., a cutting head, a crimping head, a pressing head, a hammer head, a ratchet head, etc.), a tool bit (e.g., a screwdriver bit), tool jaws (e.g., an expander jaw), blades (e.g., circular blades, rectangular blades, etc.), discs (e.g., a grinder disc), etc. The implementation of the functionality on the work piece can be in various forms. For example, the functionality can be cutting, crimping, drilling, fastening (e.g., by driving of a screw, bolt, etc., into a work piece), hammering, punching, expanding, grinding, welding (e.g., via grinding), etc. In some embodiments, the implementation of the functionality corresponds to the type of moveable component (e.g., how the moveable component is implemented). For example, if the tool 102 includes a cutting head as the moveable component (e.g., coupled to the actuator 108), then the functionality of the tool 102 (e.g., its tool operation) can be cutting a work piece.

The tool 102 can include a power source 110, a controller 112, an antenna 114, a connector 116, and sensors 118. The power source 110 can provide power to some or all of the components of the tool 102. For example, the power source 110 can power the actuator 108, the controller 112, the antenna 114 (including other communication systems), the sensors 118, etc. The power source 110 can be implemented in different ways. For example, the power source 110 can be a battery, a rechargeable battery (e.g., a lithium-ion battery), or an electrical cord that receives power from an electrical outlet or other power source.

The controller 112 can be coupled to and can be located within or onboard the body of the tool 102. The controller 112 is generally configured to control operations of the tool 102, which can include receiving information from components of the tool 102, instructing components of the tool 102, etc. For example, the controller 112 can be configured to operate the tool 102 to implement the functionality of the tool 102 on a work piece, which can include the controller 112 causing the actuator 108 to move the moveable component (e.g., by directing power from the power source 110 to the actuator 108). Thus, the controller 112 can be in communication with all or some of the components of the tool 102. For example, the controller 112 can be in communication with the actuator 108, the power source 110, the antenna 114 (and other corresponding circuitry), the connector 116, and the sensors 118. In some embodiments, the controller 112 can be implemented as a processor device, a microcontroller, a field-programmable gate array, a programmable logic controller, logic gates, etc. In addition, the controller 112 can also include other computing components, such as memory, inputs (e.g., user interfaces, such as actuatable buttons), other output devices (e.g., light indicators), etc.

The antenna 114 can facilitate wireless communication between the remote device 104 and the tool 102. For example, the antenna 114 can be in communication with the remote device 104 and can transmit and receive signals to and from the remote device 104. In some embodiments, rather than having a single antenna 114 that can both receive and transmit signals, the tool 102 can include two antennas that are each dedicated to either transmission or receiving. For example, one antenna can only receive signals (e.g., from the remote device 104), while the other antenna can only transmit signals (e.g., to the remote device 104). In some cases, the antenna 114 can be configured to simultaneously transmit and receive signals (e.g., the antenna 114 including or being a transceiver). In some embodiments, the antenna 114 can be configured to receive and transmit wireless signals according to the Bluetooth® wireless protocol. In some embodiments, the tool 102 can have only a single antenna, such as the antenna 114 (e.g., where the tool 102 does not include any other antenna).

In some embodiments, the antenna 114 of the tool 102 can be coupled the body of the tool 102 and can be located within an internal volume of the tool 102 (e.g., defined by the body of the tool 102). In particular, the antenna 114 can be fully enclosed by the body of the tool 102 and can be internal to the body of the tool 102. In other embodiments, however, the antenna 114 can be coupled to the body of the tool 102 so that the antenna 114 is external to the body of the tool 102. In still other embodiments, the tool 102 does not include any antennas (e.g., the tool 102 does not include the antenna 114), but rather relies on the antenna of the extender 106 for wireless communication. In this way, the cost of the tool 102 can be minimized, and only when remote control of the tool 102 is desired, then the tool 102 can utilize the extender 106.

In some embodiments, the antenna 114 can be part of a wireless module (e.g., a Bluetooth® wireless module). In these embodiments, the wireless module can include the antenna 114 (or multiple antennas as described above) and can include various electrical components that can facilitate communication using the wireless module, such as, for example, oscillators, regulators (e.g., voltage regulators), transceiver circuitry, timers, other communication interfaces (e.g., a serial interface), input and output ports, amplifiers, and other circuitry. In some embodiments, the wireless module can be a Bluetooth® wireless module, so that the wireless module can transmit wireless signals to and receive wireless signals from the remote device 104 over a suitable wireless communication channel (e.g., according to the Bluetooth® wireless protocol). In some specific embodiments, the wireless module can be implemented as the BGM13S Bluetooth® wireless module (made available by Silicon Labs, Austin Tex., USA).

The connector 116 can be generally configured to removably receive a portion of the extender 106 (e.g., the connector) to electrically connect the extender 106 to the controller 112 of the tool 102. In particular, along with the connector 116 of the tool 102, the extender 106 can also include a connector, which will be described in more detail below. The connectors are configured to be mechanically coupled (e.g., removably coupled) together so that when the connectors are coupled together, the extender 106 is electrically connected to the tool 102. In some embodiments, the connector 116 can include one or more coupling features (e.g., protrusions, slots, recesses, etc.) that facilitate mechanical coupling with the portion of the extender 106. The connector 116 can also include electrical connections (e.g., electrical pins) that electrically connect to electrical inputs, electrical outputs, etc., of the controller 112 of the tool 102, of a wireless module of the tool 102 (e.g., that includes the antenna 114), of the antenna 114, or of other components of the tool 102, etc.

In some embodiments, the tool 102 can include one or more sensors 118, which can be in communication with the controller 112 of the tool 102. The sensors 118 can be implemented in different ways. For example, one sensor can be a trigger that can be coupled to and can be located within or physically onboard the body of the tool 102. In some cases, this trigger can be actuated (e.g., by a user), and an indication of actuation of the trigger can be received by the controller 112 to be used to initiate a tool operation. In particular, for example, if the trigger is actuated, the controller 112 can cause the actuator 108 to move the moveable component to initiate a tool operation on a work piece (e.g., a cutting operation). In some embodiments, information from the sensors 118 can be utilized by the controller 112 to cause the actuator 108 to move (or stop, or retract) the moveable component (e.g., to implement the functionality on the work piece). In these embodiments, for example, the sensor inputs can include position sensor information indicating the position of the actuator 108, pressure sensor information indicating hydraulic pressure in chambers of a hydraulic actuator, etc.

In some embodiments, one or more of the sensors 118 can detect a presence of a portion of the extender 106 that is to be engaged with the connector 116 of the tool 102 (e.g., the connector of the extender 106). In this way, the controller 112 of the tool 102 can determine that the extender 106 is electrically connected to the tool 102, based on signals from the one or more sensors 118. For example, a sensor 118 can sense that the extender 106 is in proximity to the connector 116 of the tool 102. In this case, the sensor 118 can be a Radio Frequency ("RF") sensor that can sense the RF power, e.g., a voltage standing wave ratio ("VSWR"), which is delivered to an antenna 114 that can be electrically connected to the controller 112. For example, the controller 112 can provide an RF signal to an electrical connection that delivers RF signals to the antenna 120 of the extender 106 when the extender 106 is electrically connected to the controller 112 of the tool 102. Thus, for example, the controller 112 can determine that the extender 106 is electrically connected to the tool 102, based on sensor 118 information from the RF sensor, and in particular, whether or not the RF sensor receives a signal. As another example, the sensor 118 can be a magnetic sensor that can sense the proximity of a magnetic material (e.g., of the extender 106), or an optical sensor, e.g., a photosensor, a photodiode, a phototransistor, an imaging sensor (e.g., a CCD or CMOS imaging sensor that is a 1D, or 2D imaging sensor), etc., that can sense the proximity based on illumination or lack thereof. As yet another example, the sensor 118 can include an electrical input and an electrical output. In particular, the electrical output can provide a signal (e.g., a 5V signal) and, if the extender 106 is electrically connected to the tool 102, the electrical input receives the 5V signal indicating the extender 106 is connected. Otherwise, no signal is provided to the electrical input, and the controller 112 determines that the extender 106 is not connected to the tool 102. As yet another example, the sensor 118 can be an electrical input that can receive different signals based on whether or not the extender 106 is electrically connected to the tool 102. For example, when the extender 106 is not electrically connected to the tool 102, the electrical input continuously receives a signal (e.g., from a power supply, such as 5V). However, when the extender 106 is electrically connected to the tool 102, an electrical connection is formed between the electrical input and ground (e.g., a ground pin), and a ground signal (e.g., 0V) is provided to the controller 112. Thus, when the controller 112 receives a ground signal at the electrical input, the controller 112 can determine that the extender 106 is electrically connected to the tool 102.

In some embodiments, the remote device 104 can be implemented in different ways. For example, the remote device 104 can include components such as a processor, memory, a display, inputs (e.g., a keyboard, a mouse, a graphical user interface, a touch-screen display, one or more actuatable buttons, etc.), communication devices (e.g., an antenna and appropriate corresponding circuitry), etc. In some embodiments, the remote device 104 can simply be implemented as a processor. In some specific embodiments, the remote device 104 can be implemented as a mobile phone (e.g., a smart phone), a personal digital assistant ("PDA"), a laptop, a notebook, a netbook computer, a tablet computing device, etc. As described below, the remote device 104 can cause the tool 102 to implement the functionality on the work piece (e.g., via interaction with the user interface of the remote device 104).

In some embodiments, the remote device 104 can be associated with the tool 102 using a near field communication ("NFC") communication protocol, which can be used to exchange device identification information. In this way, the remote device 104 and the tool 102 can establish a wireless communication channel (e.g., a Bluetooth® wireless communication channel) faster than utilizing a discovery process (e.g., a Bluetooth® discovery process) at least because the tool 102 and the remote device 104 have already exchanged device identification information with each other (e.g., the remote device 104 receiving identification information of the tool 102).

As shown in FIG. 1, the extender 106 can include an antenna 120, an electrical cable 122, and a connector 124 that can be removably coupled to the connector 116 of the tool 102. The antenna 120, the electrical cable 122, and the connector 124 are all in wired electrical communication with each other. For example, a first end of the electrical cable 122 is coupled to the antenna 120, and an opposing second end of the electrical cable 122 is coupled to the connector 124. However, in other embodiments, the connector 124 and the antenna 120 can be coupled to the electrical cable 122 in a different manner. For example, the connector 124 can be coupled to a central region of the electrical cable 122 (e.g., halfway along its length). In some embodiments, the antenna 120 can be a single antenna that can both receive and transmit signals, while in other embodiments, the extender 106 can include two antennas that are each dedicated to either transmission or reception. In some cases, the antenna 120 can be configured to simultaneously transmit and receive signals (e.g., the antenna 120 including or being a transceiver). In some embodiments, the antenna 120 can be configured to receive and transmit wireless signals according to the Bluetooth® wireless protocol.

In some embodiments, the antenna 120 can be part of a wireless module (e.g., a Bluetooth® wireless module). In these embodiments, the wireless module can include the antenna 120 (or multiple antennas as described above), and can include various electrical components that can facilitate communication using the wireless module, such as, for example, oscillators, regulators (e.g., voltage regulators), transceiver circuitry, timers, other communication interfaces (e.g., a serial interface), input and output ports, and other circuitry. In some embodiments, the wireless module can be a Bluetooth® wireless module, so that the wireless module can transmit wireless signals to and receive wireless signals from the remote device 104 over a suitable wireless communication channel (e.g., according to the Bluetooth® wireless protocol). In some specific embodiments, the wireless module can be implemented as the BGM13S Bluetooth® wireless module (made available by Silicon Labs, Austin Tex., USA).

The electrical cable 122 can be configured to facilitate wired communication between the antenna 120 of the extender 106 and the controller 112 of the tool 102. For example, such as when the connector 124 of the extender 106 is coupled to the connector 116 of the tool 102, the controller 112 can transmit and receive signals from the antenna 120 of the extender 106. The electrical cable 122 can be implemented in different ways. For example, the electrical cable 122 can be a coaxial cable, other communication cables, etc. In some embodiments, the electrical cable 122 can include various wires for communication, such as, for example, signal wires, ground wires, etc. In some embodiments, the electrical cable 122 can have different lengths. For example, one extender 106 can have an electrical cable with a length that is greater than a length of an electrical cable of a different extender 106. In this way, different extenders 106 can be electrically connected to the tool 102, based on the amount of signal extension being required (e.g., with longer electrical cables the antenna 120 of the extender 106 can be unraveled farther from the tool 102 thereby providing a longer communication range).

In some embodiments, the electrical cable 122 can define a power cable and a signal cable. For example, the power cable of the electrical cable 122 can include multiple wires that can interface with the connector 124. In this way, with the connectors 116, 124 electrically connected, power is delivered from the power source 110 of the tool 102 to the wireless module and to the antenna (e.g., if the extender 106 includes a wireless module). In some cases, the signal cable of the electrical cable 122 can also include multiple wires (e.g., a ground wire, a signal wire, etc.) that interface with the connector 124. In this way, when the connectors 116, 124 are electrically connected, the ground wire of the signal cable is electrically connected to a ground of the tool 102, and the signal wire of the signal cable is electrically connected to signal source of the tool 102 (e.g., the wireless module of the tool 102). In other configurations, including when the extender 106 included a wireless module, a signal wire can be electrically connected to the wireless module, and the controller 112 of the tool 102 can transmit data to the wireless module of the extender 106 over the signal wire to cause the antenna to emit a wireless signal.

In some embodiments, the connector 124 of the tool 102 can be implemented in a similar manner as the connector 116 of the tool 102. For example, the connector 124 of the extender 106 can include one or more coupling features (e.g., protrusions, slots, recesses, etc.) that mechanically engage the one or more coupling features of the connector 116 of the tool 102 to removably couple the connectors 116, 124 together. In this way, with the connectors 116, 124 mechanically connected, the connectors 116, 124 electrically connect together, thereby electrically connecting the antenna 120 (and other corresponding circuitry, such as the wireless module) to the controller 112 (and other corresponding circuitry, such as the wireless module) of the tool 102. In some cases, the one or more coupling features of the connectors 116, 124 can include protrusions (e.g., that are threaded), slots, recesses (e.g., that are threaded), fasteners (e.g., screws, bolts, etc.), clips (e.g., those with a retractable arm that releasingly engages and disengages with a recess), etc.

In some specific embodiments, a coupling feature of the connector 116 can include a recess (or a protrusion), and a coupling feature of the connector 124 of the extender 106 can include a protrusion (or a recess). In this way, the protrusion (or recess) of the connector 124 inserts (or is received) into the recess (or by the protrusion) of the connector 116 to mechanically couple the connectors 116, 124 together thereby electrically connecting the connectors 116, 124 together. In other configurations, the connector 116 can be a female connector, and the connector 124 can be a male connector (or vice versa). Regardless, with the connectors 116, 124 electrically connected, the tool 102 (e.g., the controller 112) electrically connects to the extender 106 (e.g., the antenna 120). In another specific embodiment, a coupling feature of the connector 124 can include one or more electrical pins (or electrical slots), and the coupling feature of the connector 124 can include one or more electrical slots (or electrical pins). In this way, the electrical pin of one of the connectors 116, 124 is inserted into the electrical slot of the other one of the connectors 116, 124 to mechanically couple the connectors 116, 124 together, thereby electrically connecting the connectors 116, 124 together (and thus electrically connecting the tool 102 to the extender 106).

As shown in the embodiment of FIG. 1, the controller 112 of the tool 102 can establish a wireless communication channel 126 (e.g., a Bluetooth® wireless communication channel) that is directly between the tool 102 (e.g., the antenna 114 of the tool 102) and the remote device 104. With the wireless communication channel 126 established, bidirectional communication between the tool 102 and the remote device 104 is also established. In this way, the remote device 104 can control (e.g., receive data from and transmit instructions to) the tool 102, which can include the remote device 104 causing the tool 102 to activate the actuator 108 and to implement the tool operation (e.g., a tool functionality) on a work piece. In some embodiments, the tool 102 can operate in a first mode of operation (e.g., a normal mode of operation) in which (continuous or non-continuous) actuation of the trigger of the tool 102 causes the tool 102 to implement a functionality (e.g., a tool operation) on a work piece. In some embodiments, the tool 102 can operate in a second mode of operation (e.g., a remote mode of operation) in which the remote device 104 directly communicates with and controls the tool 102 (e.g., over the wireless communication channel 126). In some embodiments, the tool 102 can operate in a third mode of operation (e.g., a remote signal extension mode of operation) in which the remote device 104 indirectly communicates with and controls the tool 102. For example, when the connectors 116, 124 are electrically connected, the extender 106 is electrically connected to the tool 102 and the controller 112 of the tool 102 can establish a wireless communication channel 128 (e.g., a Bluetooth® wireless communication channel) between the extender 106 (e.g., the antenna 120 of the extender 106) and the remote device 104. With the wireless communication channel 128 established, the remote device 104 can indirectly communicate in a bidirectional manner with the tool 102, via the extender 106. In other words, the controller 112 can transmit signals along the electrical cable 122 to the antenna 120 to be transmitted to the remote device 104 via the communication channel 128. Similarly, the antenna 120 (or a different antenna) can receive signals from the remote device 104, transmit them back along the electrical cable 122, to be received by the controller 112 of the tool 102.

In some embodiments, the controller 112 of the tool 102 can switch between the three modes of operation. For example, the controller 112 can switch from the first mode of operation to the second mode of operation, based on a signal received from the remote device 104 (or a user input, such as from a user interface). Similarly, the controller 112 of the tool 102 can switch between the second mode of operation (or the first mode of operation) to the third mode of operation, based on the controller 112 of the tool 102 determining that the extender 106 is electrically connected to the tool 102 (e.g., the connectors 116, 124 are electrically connected to each other), which can be based on a sensor 118 sensing that the connectors 116, 124 are electrically connected to each other. In this way, the controller 112 can automatically switch to the third operation mode that utilizes the extender 106, when the extender 106 is electrically connected to the tool 102, which can save time for the operator of the tool 102. In some configurations, the controller 112 of the tool 102 can switch to operating the tool 102 in the third mode of operation, based on receiving a user input (e.g., from a user interface), such as the remote device 104.

Figure 2A:
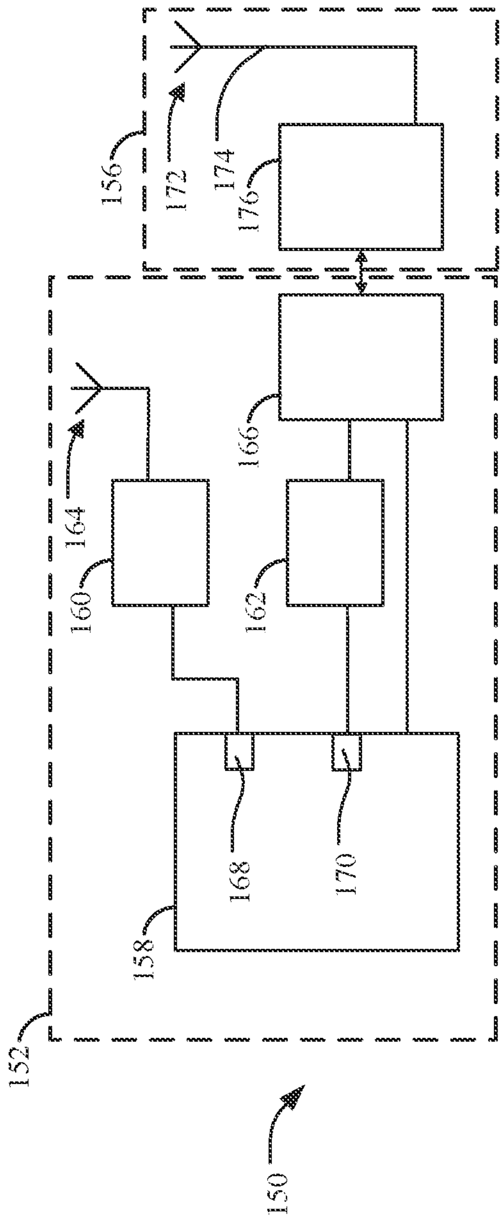
FIG. 2A is a schematic illustration of a wireless module configuration of a tool system that includes a tool and an extender.

FIG. 2A illustrates a wireless module configuration of a tool system 150 that includes a tool 152 and an extender 156. In some embodiments, the tool system 150 is a specific implementation of the tool system 100, and thus can be implemented in a similar manner as the tool system 100. For example, the tool 152 can be a specific implementation of the tool 102, and thus the tool 152 can also include similar components and features as the tool 102, such as, for example, an actuator (and a moveable component), a power source, a controller, an antenna, a connector, and sensors. Similarly, the extender 156 can also be a specific implementation of the extender 106, and thus can include similar components and features as the extender 106.

As shown in FIG. 2A, the tool 152 can include a controller 158, wireless modules 160, 162, an antenna 164, and a connector 166, each of which can be a specific implementation of a corresponding component that has been previously described. The controller 158 is illustrated as having at least two electrical ports 168, 170, each of which can include any number of electrical inputs (e.g., a pin) to the controller 158, any number of electrical outputs (e.g., a pin) from the controller 158, etc., to electrically connect the components together. For example, the wireless module 160 is electrically connected to the electrical port 168 of the controller 158, while the wireless module 162 is electrically connected to the electrical port 170 of the controller 158. In some embodiments, the antenna 164 can be electrically connected to the wireless module 160 and can be part of the wireless module 160. As illustrated in FIG. 2A, the wireless module 162 is also electrically connected to the connector 166. Additionally, the connector 166 can be electrically connected to the controller 158 (e.g., to electrically connect a ground pin of the controller 158 to the connector 166).

In some embodiments, the extender 156 can include an antenna 172, an electrical cable 174, and a connector 176, all of which are electrically connected to each other. For example, one end of the electrical cable 174 is electrically connected to the antenna 172, while an opposing end of the electrical cable 174 is electrically connected to the connector 176. When the connectors 166, 176 are electrically connected together (e.g., mechanically coupled together), the antenna 172 electrically connects to the wireless module 162. In this way, the controller 112 of the tool 102 can instruct the wireless module 162 to transmit and receive wireless signals through the antenna 172. For example, a pin of the connector 176 that is electrically connected to a signal wire of the extender 156 (e.g., that provides RF signals to the antenna 172) is inserted into a slot of the connector 166 thereby electrically connecting the signal wire to the wireless module 162. Similarly, a pin of the connector 176 that is electrically connected to a ground wire of the extender 156 (e.g., that provides a ground connection for the antenna 172) is inserted into a slot of the connector 166 thereby electrically connecting the ground wire to an electrical ground (e.g., the ground pin of the controller 158). In some embodiments, the controller 112 can select which wireless module 160, 162 to utilize, and thus which antenna to utilize for wireless communication, based on, for example, whether or not the extender 156 is electrically connected to the tool 102. In some embodiments, when the connectors 166, 176 are electrically connected together, power from the power source of the tool 152 can be delivered to a wireless module of the extender 156 and to the antenna 172 (e.g., via a power cable of the electrical cable 174, such as when the extender 156 includes the wireless module 162 rather than the tool 152). In some cases, when the connectors 166, 176 are electrically connected together, a signal cable of the electrical cable 174 can be electrically connected with the tool 152. For example, a ground wire of the signal cable can electrically connect with a ground of the tool 152 (e.g., a ground pin), and a signal wire of the signal cable can electrically connect with a signal source of the tool 152 (e.g., the wireless module 162).

Figure 2B:
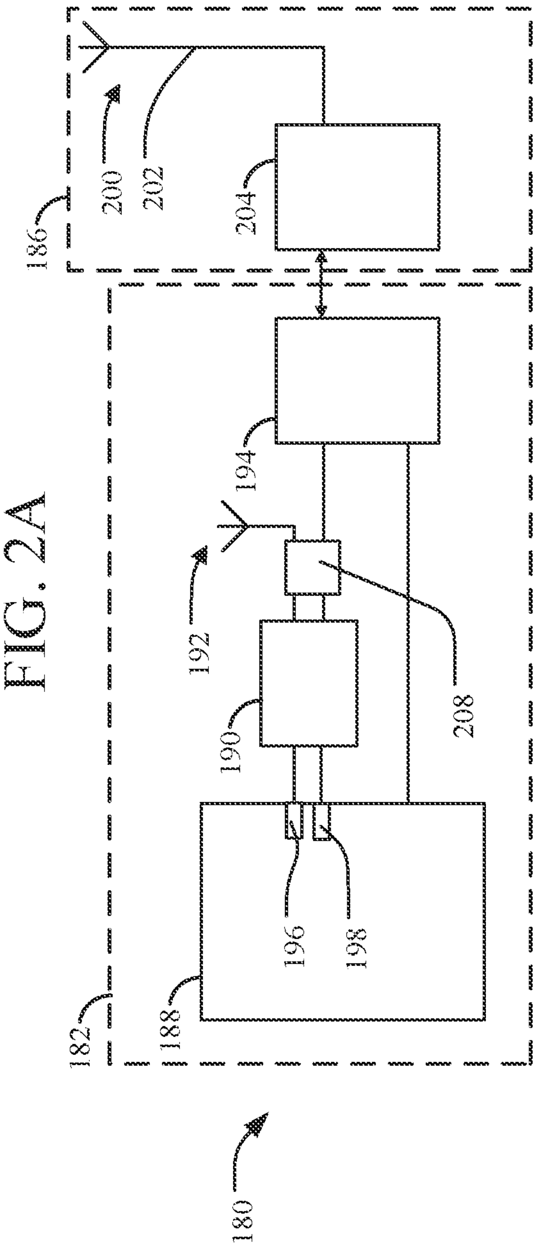
FIG. 2B is a schematic illustration of a wireless module configuration of a tool system according to another embodiment of the invention.

FIG. 2B illustrates another wireless module configuration of a tool system 180, which can also be a specific implementation of the tool system 100. The tool system 180 can include a tool 182 and an extender 186 that can be electrically connected (and disconnected) from the tool 182. The tool 182 can include a controller 188, a wireless module 190, an antenna 192, and a connector 194, each of which can be a specific implementation of a corresponding component that has been previously described. The controller 188 is illustrated as having at least two electrical ports 196, 198, each of which can include any number of electrical inputs and outputs (e.g., pins) of the controller 188 to electrically connect the components together. For example, the electrical port 196 is electrically connected to the wireless module 190 and the antenna 192, while the electrical port 198 is electrically connected to the wireless module 190 and the connector 194. As shown in FIG. 2B, and unlike the tool 152, the tool 182 includes only one wireless module 190, rather than two wireless modules. In this way, because the wireless module 190 is electrically connected to both electrical ports 196, 198, the controller 188 can select which antenna the wireless module 190 utilizes for wireless communication.

In some embodiments, the extender 186 can include an antenna 200, an electrical cable 202, and a connector 204, all of which are electrically connected to each other. For example, one end of the electrical cable 202 is electrically connected to the antenna 200, while an opposing end of the electrical cable 202 is electrically connected to the connector 204. When the connectors 194, 204 are electrically connected together (e.g., mechanically coupled together), the antenna 200 electrically connects to the wireless module 190. In this way, the controller 188 of the tool 182 can instruct the wireless module 190 to transmit and receive wireless signals at the antenna 200. In some embodiments, the controller 188 can select which of the antennas 192, 200 to utilize for wireless communication, based on, for example, whether or not the extender 186 is electrically connected to the tool 182. For example, in one mode of operation, the controller 188 can cause the wireless module 190 to transmit and receive wireless signals at the antenna 192 (e.g., via the electrical port 196), while not utilizing the antenna 200 for wireless communication. Alternatively, in another mode of operation, the controller 188 can cause the wireless module 190 to transmit and receive wireless signals at the antenna 200 (e.g., via the electrical port 198), while not utilizing the antenna 192 for wireless communication. In some embodiments, when the connectors 194, 204 are electrically connected together, power from the power source of the tool 182 can be delivered to a wireless module of the extender 186 and to the antenna 200 (e.g., via a power cable of the electrical cable 202, such as when the extender 186 includes a wireless module). In some cases, when the connectors 194, 204 are electrically connected together, a signal cable of the electrical cable 202 can be electrically connected with the tool 182. For example, a ground wire of the signal cable can electrically connect with a ground of the tool 182 (e.g., a ground pin), and a signal wire of the signal cable can electrically connect with a signal source of the tool 182 (e.g., the wireless module 190).

In some embodiments, rather than having two electrical ports 196, 198 that both electrically connect to the wireless module 190, the controller 188 can include only one electrical port (e.g., the electrical port 196) that is electrically connected to the wireless module 190. In this case, the tool 182 can also include an electrical relay 208 (or an electrical switch) that in one position (or mode of operation) is electrically connected to the antenna 192 and in a different position (or mode of operation) is electrically connected to the connector 194, and thus the antenna 200 of the extender 186, when the connectors 194, 204 are electrically connected together. In some embodiments, the controller 188 can switch the position of an arm of the relay 208 (or can excite or deactivate the electrical switch) to change which antenna 192, 200 is electrically connected to the wireless module 190 (with the other antenna being temporarily electrically disconnected from the wireless module 190), which can be based on the controller 188 determining that the connectors 194, 204 are electrically connected together.

Figure 2C:
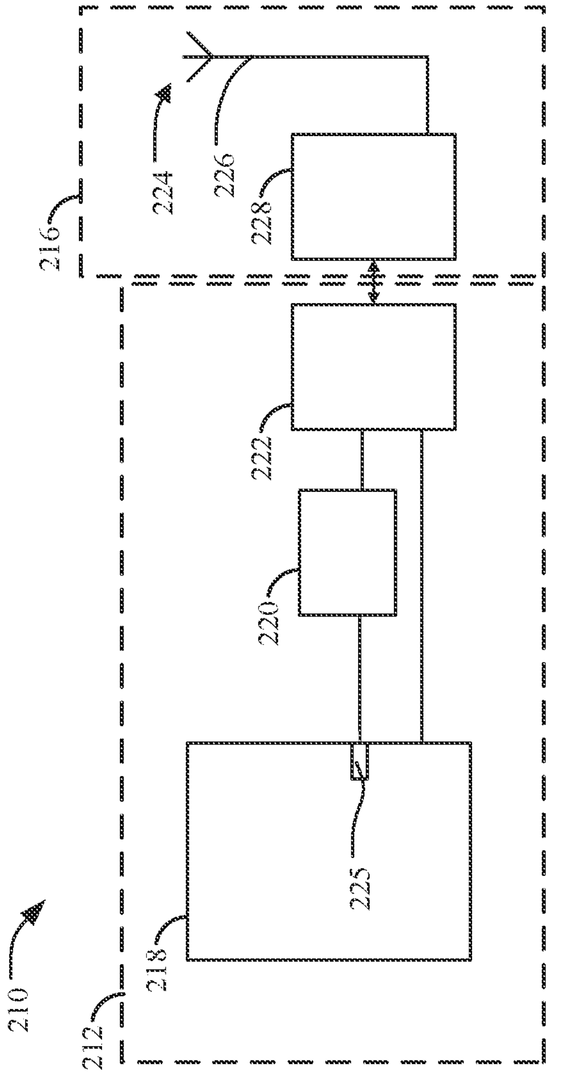
FIG. 2C is a schematic illustration of a wireless module configuration of a tool system according to yet another embodiment of the invention.

FIG. 2C illustrates another wireless module configuration of a tool system 210, which can also be a specific implementation of the tool system 100. The tool system 210 can include a tool 212 and an extender 216 that can be electrically connected and disconnected from the tool 212. The tool 212 can include a controller 218, a wireless module 220, and a connector 222, each of which can be a specific implementation of a corresponding component that has been previously described. The controller 218 is illustrated as having at least one electrical port 225, which can include any number of electrical inputs and outputs (e.g., pins) of the controller 218 to electrically connect the components together. For example, the electrical port 225 is electrically connected to the wireless module 220. As shown in FIG. 2C and unlike the tools 152, 182, the tool 212 does not include an antenna (e.g., that is located within the body of the tool 212, coupled externally to the tool 212, etc.). So, in order for the tool 212 to operate in a wireless mode of operation (e.g., to communicate with a remote device), the extender 216 must be electrically connected to the tool 212. In some embodiments, when the connectors 222, 228 are electrically connected together, power from the power source of the tool 212 can be delivered to a wireless module of the extender 216 and to the antenna 224 (e.g., via a power cable of the electrical cable 226, such as when the extender 216 includes a wireless module). In some cases, when the connectors 222, 228 are electrically connected together, a signal cable of the electrical cable 226 can be electrically connected with the tool 212. For example, a ground wire of the signal cable can electrically connect with a ground of the tool 212 (e.g., a ground pin), and a signal wire of the signal cable can electrically connect with a signal source of the tool 212 (e.g., the wireless module 220).

In some embodiments, the extender 216 can include an antenna 224, an electrical cable 226, and a connector 228, all of which are electrically connected to each other. For example, one end of the electrical cable 226 is electrically connected to the antenna 224, while an opposing end of the electrical cable 226 is electrically connected to the connector 228. When the connectors 222, 228 are electrically connected together (e.g., mechanically coupled together), the antenna 224 electrically connects to the wireless module 220. In this way, the controller 218 of the tool 212 can instruct the wireless module 220 to transmit and receive wireless signals at the antenna 224. In some embodiments, the controller 218 can enable or disable a remote communication mode of operation (e.g., that utilizes the antenna 224) based on, for example, whether or not the extender 216 is electrically connected to the tool 212.

Figure 3A:
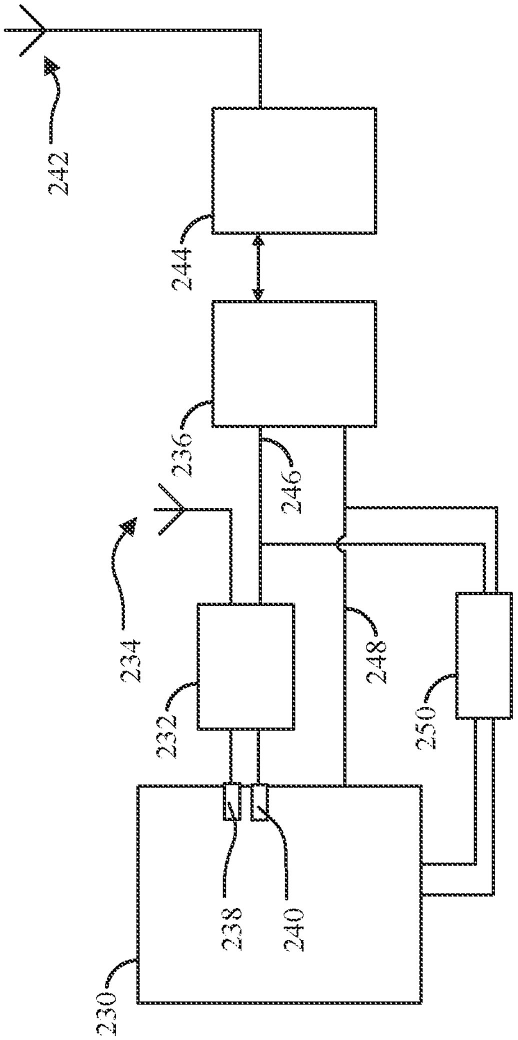
FIG. 3A is a schematic illustration of a tool electrically connected with an extender according to one embodiment of the invention.

FIG. 3A illustrates a tool that can be electrically connected and disconnected with an extender according to one embodiment in which the controller of the tool can determine that the extender is electrically connected to the tool. The tool can be implemented in a similar manner as the tools described previously and can include a controller 230, a wireless module 232, an antenna 234, and a connector 236, each of which can be a specific implementation of a corresponding component that has been previously described. The controller 230 is illustrated as having at least two electrical ports 238, 240, which can include any number of electrical inputs and outputs (e.g., pins) of the controller 230 to electrically connect the components together. For example, both the electrical ports 238, 240 are electrically connected to the wireless module 232, with the electrical port 238 being used to receive and transmit signals at the antenna 234 (e.g., via the wireless module 232) and with the electrical port 240 being used to receive and transmit signals at an antenna 242 of an extender (e.g., via the wireless module 232). Although FIG. 3A is illustrated as having only a single wireless module 232 that selectively utilizes either the antenna 234 or the antenna 242 of the extender for wireless communication (e.g., corresponding to the configuration of the tool), in other configurations, the tool can include other numbers of wireless modules and antennas as previously described (e.g., corresponding to the other wireless module configurations of FIGS. 2A-2C).

In some embodiments, the extender can also be implemented in a similar manner as the extenders described previously. For example, the extender can include an antenna 242 and a connector 244 that is electrically connected to the antenna 242. When the connectors 236, 244 are electrically connected together (e.g., mechanically coupled together), the antenna 242 electrically connects to the wireless module 232 so that the controller 230 can utilize the antenna 242 for wireless communication.

As shown in FIG. 3A, the tool also includes an RF sensor 250 (e.g., a specific implementation of the one or more sensors 118). The RF sensor 250 is illustrated as having at least two leads, with one being electrically connected to a signal wire 246 of the wireless module 232, and with another being electrically connected to a ground wire 248 that electrically connects to a ground (e.g., of the controller 230). When the connectors 236, 244 are electrically connected, the signal wire of the antenna 242 electrically connects to the signal wire 246, and the ground wire of the antenna 242 electrically connects to the ground wire 248. In this way, with the connectors 236, 244 connected, an RF path is electrically established between the wireless module 232 and the antenna 242. In some embodiments, the controller 230 can receive (e.g., from the RF sensor 250) an RF signal being delivered to the antenna 242, compare this RF signal to a threshold (e.g., by determining a VSWR), and based on this comparison, determine whether or not the extender is electrically connected to the tool. For example, if little to no RF signal is sensed by the RF sensor 250 (and received by the controller 230), the controller 230 can determine that the extender is not electrically connected to the tool, and utilize the antenna 234 for wireless communication (and disable utilization of the antenna 242 for wireless communication). If, however, the RF signal that is sensed by the RF sensor 250 (and received by the controller 230) is within the threshold, the controller 230 can determine that the extender is electrically connected to the tool, and utilize the antenna 242 for wireless communication (and disable utilization of the antenna 234 for wireless communication). Thus, in some cases, the wireless module 232 can transmit an RF signal simultaneously to each of the antennas 234, 242. In this way, if the connectors 236, 244 are electrically connected, the RF signal can be transmitted to the antenna 242, which can be sensed by the RF sensor 250. In other configurations, the controller 230 can test whether or not the antenna 242 of the extender is electrically connected to the tool. For example, the controller 230 can cause the wireless module 232 to attempt to transmit an RF signal to the antenna 242 (e.g., along the signal wire 246). In this case, when the antenna 242 is electrically connected to the tool (e.g., the wireless module 232), the RF signal is transmitted along the signal wire 246 to the antenna 242. This RF signal can then be sensed by the RF sensor 250, which can then determine that the extender is electrically connected to the tool. In other configurations, when the antenna 242 is electrically disconnected from the tool (e.g., the wireless module 232), the RF signal is blocked from being transmitted to the antenna 242 along the signal wire 246. Thus, the controller 230 can determine that the extender is electrically disconnected from the tool, based on the lack of an RF signal propagating along the signal wire 246 to the antenna 242.

Figure 3B:
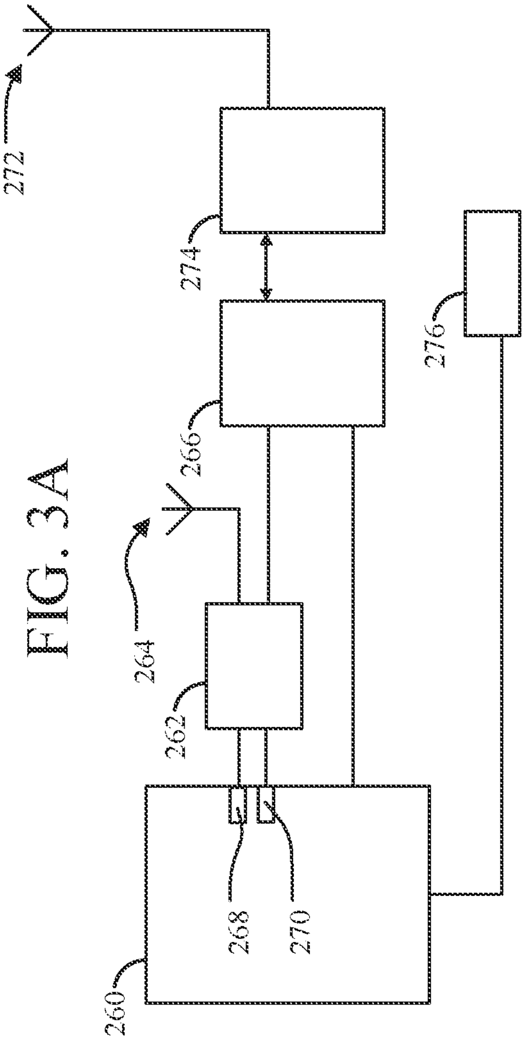
FIG. 3B is a schematic illustration of a tool that can be electrically connected with an extender according to another embodiment of the invention.

FIG. 3B illustrates a tool that can be electrically connected and disconnected with an extender in one embodiment of the invention in which the controller of the tool can determine that the extender is electrically connected to the tool. The tool can be implemented in a similar manner as the tools described previously and can include a controller 260, a wireless module 262, an antenna 264, and a connector 266, each of which can be a specific implementation of a corresponding component that has been previously described. The controller 260 is illustrated as having at least two electrical ports 268, 270, which can include any number of electrical inputs and outputs (e.g., pins) of the controller 260 to electrically connect the components together. For example, both the electrical ports 268, 270 are electrically connected to the wireless module 262, with the electrical port 268 being used to receive and transmit signals at the antenna 264 (e.g., via the wireless module 262), and with the electrical port 270 being used to receive and transmit signals at an antenna 272 of the extender (e.g., via the wireless module 262). Although FIG. 3A illustrates only a single wireless module 262 that selectively utilizes either the antenna 264 or the antenna 272 of the extender for wireless communication (e.g., corresponding to the configuration of the tool), in other configurations, the tool can include other numbers of wireless modules and antennas as previously described (e.g., corresponding to the other wireless module configurations of FIGS. 2A-2C).

In some embodiments, the extender can also be implemented in a similar manner as the extenders described previously. For example, the extender can include the antenna 272 and a connector 274 that is electrically connected to the antenna 272. When the connectors 266, 274 are electrically connected together (e.g., mechanically coupled together), the antenna 272 electrically connects to the wireless module 232 so that the controller 230 can utilize the antenna 272 for wireless communication.

As shown in FIG. 3A, the tool also includes a presence sensor 276 (e.g., a specific implementation of the one or more sensors 118), which can be electrically connected to the controller 260. The presence sensor 276 can be configured to sense the presence of the connector 274, or the engagement between the connectors 266, 274 (e.g., via the engagement between the respective coupling features). In some embodiments, the presence sensor 276 can be coupled to the connector 266 (e.g., to a coupling feature of the connector 266), and in some more specific embodiments, can be received within a recess of the connector 266 so that the presence sensor 276 faces and can sense a recess of the connector 266 (e.g., when the one or more coupling features of the connector 266 includes a recess that receives a protrusion of the connector 274). Before the connectors 266, 274 are electrically connected together, the connector 274 is brought in proximity to the connector 266, which can be sensed by the presence sensor 276 and used to determine which antenna 264 or 272 is to be used for wireless communication. For example, the controller 260 can receive a presence signal (e.g., that was sensed by the presence sensor 276), compare the presence signal to a threshold (or otherwise analyze the presence signal), and determine whether or not the connectors 266, 274 are electrically connected together based on the comparison or analysis. As a more specific example, if the presence signal exceeds the threshold, the controller 260 can determine that the extender is not electrically connected to the tool and utilize the antenna 264 for wireless communication (and disable utilization of the antenna 272 for wireless communication). If, however, the presence signal is within the threshold, the controller 260 can determine that the extender is electrically connected to the tool and utilize the antenna 272 for wireless communication (and disable utilization of the antenna 264 for wireless communication).

The presence sensor 276 can be implemented in various ways. For example, the presence sensor 276 can be a magnetic sensor (e.g., a hall-effect sensor) that can sense magnetic components. In this embodiment, the connector 274 can include a magnetic component (or a portion, or all, of the connector 274 can be formed out of a magnetic material, such as a coupling feature of the connector 274). In this embodiment, as the connector 274 is brought closer to the connector 266, the magnetic sensor can detect magnetic portions of the connector 274 to be used for sensing the engagement between the connectors 266, 274. As another example embodiment, the presence sensor 276 can be an optical sensor (e.g., a photosensor, a photodiode, a phototransistor) that can optically sense components from the connector 274. For example, an optical signal can increase (or decrease, such as by optically shielding the optical sensor by the engagement between corresponding coupling features of the connectors 266, 274 or from the presence of the connector 274 blocking the optical sensor), which can be used by the controller 260 to determine that the connectors 266, 274 are electrically connected (e.g., by being mechanically coupled together). In yet another embodiment, the presence sensor 276 can be an image sensor (e.g., a 1D image sensor, a 2D image sensor), which can be part of a camera, and thus can include other optical components, such as, for example, lenses, prisms, optical filters, etc. The controller 260 can acquire, using the image sensor, one or more images, subsequently analyze the one or more images, and determine that the connector 274 is electrically connected to the connector 266 (e.g., based on the analysis of the one or more images). In some embodiments, the connector 274 can have an optical symbol (e.g., a matrix barcode, such as a QR barcode), which can be easily identified by the controller 260 in the one or more images to determine that the connector 274 is in close proximity to the connector 266.

Figure 4A:
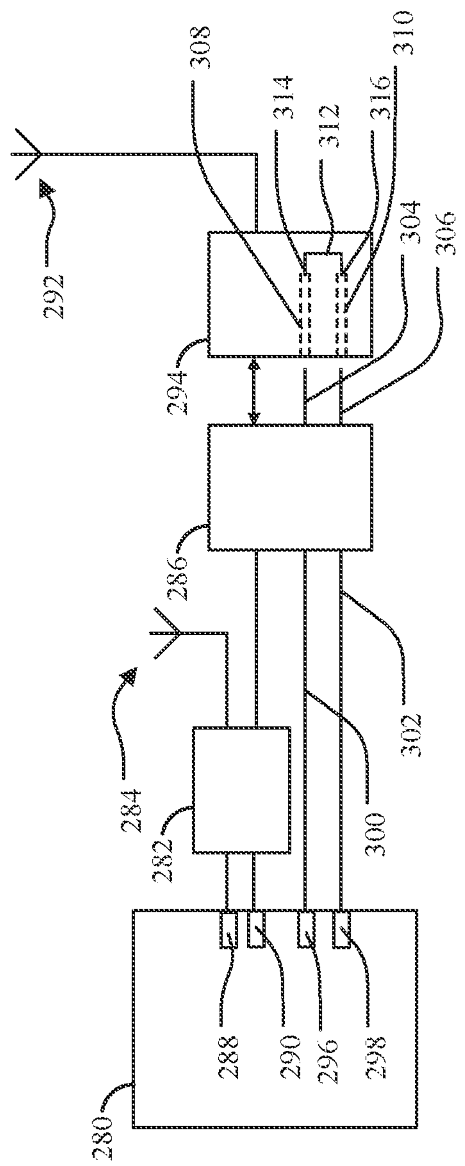
FIG. 4A is a schematic illustration of a tool that can be electrically connected with an extender according to yet another embodiment of the invention.

FIG. 4A illustrates a tool that can be electrically connected and disconnected with an extender in one embodiment of the invention in which the controller of the tool can determine that the extender is electrically connected to the tool. The tool can be implemented in a similar manner as the tools described previously and can include a controller 280, a wireless module 282, an antenna 284, and a connector 286, each of which can be a specific implementation of a corresponding component that has been previously described. The controller 280 is illustrated as having at least two electrical ports 288, 290, which can include any number of electrical inputs and outputs (e.g., pins) of the controller 280 to electrically connect the components together. For example, both the electrical ports 288, 290 are electrically connected to the wireless module 282, with the electrical port 288 being used to receive and transmit signals at the antenna 284 (e.g., via the wireless module 282), and with the electrical port 290 being used to receive and transmit signals at an antenna 292 of the extender (e.g., via the wireless module 282). Although FIG. 4A is illustrated as having only a single wireless module 282 that selectively utilizes either the antenna 284 or the antenna 292 of the extender for wireless communication (e.g., corresponding to the configuration of the tool), in other configurations, the tool can include other numbers of wireless modules and antennas as previously described (e.g., corresponding to the other wireless module configurations of FIGS. 2A-2C).

In some embodiments, the extender can also be implemented in a similar manner as the extenders described previously. For example, the extender can include the antenna 292 and a connector 294 that is electrically connected to the antenna 292. When the connectors 286, 294 are electrically connected together (e.g., mechanically coupled together), the antenna 292 electrically connects to the wireless module 282 so that the controller 280 can utilize the antenna 292 for wireless communication. As illustrated in FIG. 4A, the controller 280 of the tool can also include a sensor (e.g., a sensor of the one or more sensors 118 of the tool 102), which can be electrically connected to the controller 280, and can be configured to sense the presence of the connector 294, or the engagement between the connectors 286, 294 (e.g., via the engagement between the respective coupling features of the connectors). In some embodiments, this sensor can be collectively defined by multiple components. For example, the controller 280 can include an electrical input 296, an electrical output 298, a wire 300 electrically connected to the electrical input 296 and the connector 286, and a wire 302 electrically connected to the electrical output 298 and the connector 286, each of which can be defined by the sensor. Additionally, the connector 286 can include an electrical pin 304 that is electrically connected to the wire 300, and an electrical pin 306 that is electrically connected to the wire 302, while the connector 294 can include opposing slots 308, 310, and a wire 312 with opposing ends 314, 316, each of which can be defined by the sensor.

In some embodiments, when the connectors 286, 294 are electrically connected together (e.g., mechanically coupled together), pins 304, 306 are inserted into the respective slot 308, 310 and each contact an end of the wire 312 to establish an electrical connection between the wires 300, 302. For example, the pin 304 is inserted into the slot 308 until the end of the pin 304 contacts the end 314 of the wire 312, while the pin 306 is inserted into the slot 310 until the end of the pin 306 contacts the end 316 of the wire 312. In other embodiments, an electrical connection can be established between the wires 300, 302 in different ways. For example, when the connectors 286, 294 are electrically connected together, the wire 312 can seat between both wires 300, 302 to create an electrical connection between the wires 300, 302.

In some embodiments, with the connectors 286, 294 electrically connected together, the electrical input 296 and the electrical output 298 are electrically connected together. In this way, the controller 280 can transmit a signal from the electrical output 298 (e.g., a 5V signal, a ground signal from being electrically connected to an electrical ground), which can be received by the electrical input 296 when the connectors 286, 294 are electrically connected together. Then, the controller 280 can determine that the connectors 286, 294 are electrically connected, based on the controller 280 receiving the signal at the electrical input 296, and thus the controller 280 can utilize the antenna 292 for wireless communication (e.g., via the wireless module 282). Additionally, the controller 280 can determine that the connectors 286, 294 are not electrically connected, based on the controller 280 not receiving the signal at the electrical input 296 (e.g., within a threshold), and thus the controller 280 can utilize the antenna 284 for wireless communication. In some configurations, the output 298 can be a ground connection, and the corresponding signal transmitted by the output 298 and received by at the input 296 can be a ground signal (e.g., zero volts).

Figure 4B:
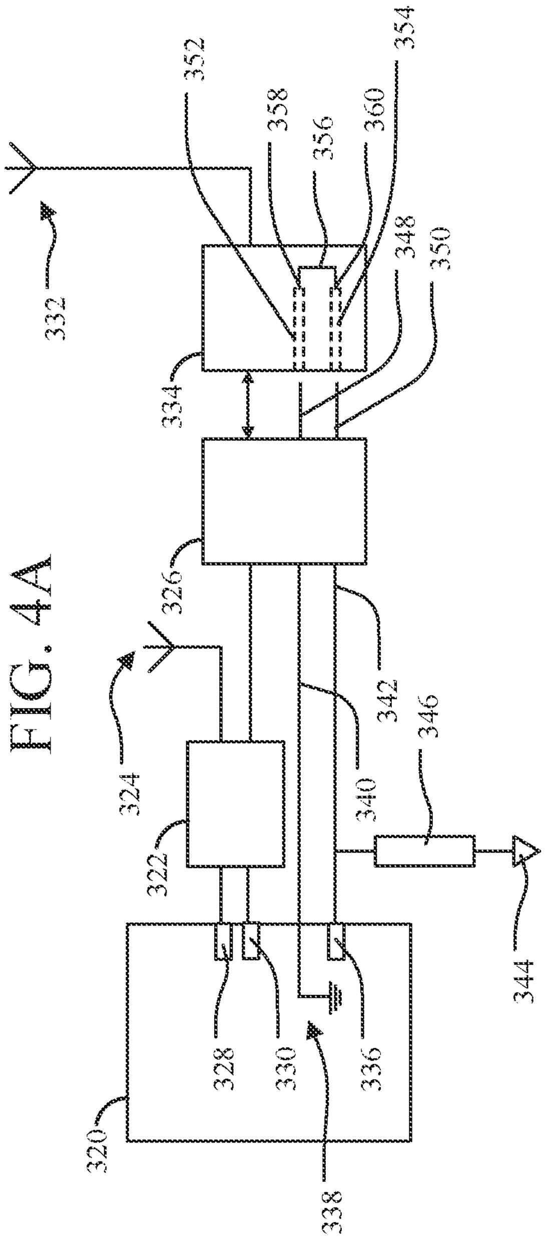
FIG. 4B is a schematic illustration of a tool that can be electrically connected with an extender according to yet another embodiment of the invention.

FIG. 4B illustrates a tool that can be electrically connected and disconnected with an extender in one embodiment of the invention in which the controller of the tool can determine that the extender is electrically connected to the tool. The tool can be implemented in a similar manner as the tools described previously and can include a controller 320, a wireless module 322, an antenna 324, and a connector 326, each of which can be a specific implementation of a corresponding component that has been previously described. The controller 320 is illustrated as having at least two electrical ports 328, 330, which can include any number of electrical inputs and outputs (e.g., pins) of the controller 320 to electrically connect the components together. For example, both the electrical ports 328, 330 are electrically connected to the wireless module 322, with the electrical port 328 being used to receive and transmit signals at the antenna 324 (e.g., via the wireless module 322), and with the electrical port 330 being used to receive and transmit signals at an antenna 332 of the extender (e.g., via the wireless module 322). Although FIG. 4B is illustrated as having only a single wireless module 322 that selectively utilizes either the antenna 324 or the antenna 332 of the extender for wireless communication (e.g., corresponding to the configuration of the tool), in other configurations, the tool can include other numbers of wireless modules and antennas as previously described (e.g., corresponding to the other wireless module configurations of FIGS. 2A-2C).

In some embodiments, the extender can also be implemented in a similar manner as the extenders described previously. For example, the extender can include an antenna 332 and a connector 334 that is electrically connected to the antenna 332. When the connectors 326, 334 are electrically connected together (e.g., mechanically coupled together), the antenna 332 electrically connects to the wireless module 322 so that the controller 320 can utilize the antenna 332 for wireless communication. As illustrated in FIG. 4B, the tool can also include a sensor (e.g., a sensor of the one or more sensors 118 of the tool 102), which can be electrically connected to the controller 320, and can be configured to sense the presence of the connector 334, or the engagement between the connectors 326, 334 (e.g., via the engagement between the respective coupling features of the connectors). In some embodiments, this sensor can be collectively defined by multiple components. For example, the controller 320 can include an electrical input 336, a ground connection 338 (e.g., a ground pin), a wire 342 electrically connected to the electrical input 336 and the connector 326, and a wire 340 electrically connected to the ground connection 338 and the connector 326. Additionally, the tool can also include a power supply 344 (e.g., a 5V power supply), and a load 346 (e.g., a resistor) electrically connected between the wire 342 and the power supply 344. As illustrated in FIG. 4B, the connector 326 also includes an electrical pin 348 that is electrically connected to the wire 340, and an electrical pin 350 that is electrically connected to the wire 342. Additionally, the connector 334 can include opposing slots 352, 354, and a wire 356 with opposing ends 358, 360, each of which can be defined by the sensor. Each of the electrical input 336, the ground connection 338, the wires 340, 342, the pins 348, 350, the slots 352, 354, and the wire 356 can be defined by the sensor.

In some embodiments, when the connectors 326, 334 are not electrically connected, the ground connection 338 is not electrically connected to the electrical input 336. Thus, a voltage that is substantially (e.g., deviating by less than 20% from) equal to the voltage of the power supply 344 (e.g., 5V) is received at the electrical input 336 (e.g., because little current flows through the load 346 to the electrical input 336). As a result, when the controller 320 receives this voltage at the electrical input 336, the controller 320 determines that the connectors 326, 334 are not electrically connected, and thus the controller 320 utilizes the antenna 324 for wireless communication. Alternatively, when the connectors 326, 334 are electrically connected together (e.g., mechanically coupled together), pins 348, 350 are inserted into the respective slot 352, 354 and each contact an end of the wire 356 to establish an electrical connection between the wires 340, 342. In this way, when the connectors 326, 334 are electrically connected together, the electrical input 336 is electrically connected to the ground connection 338 (e.g., by grounding out a pull up resistor). Thus, a ground signal is received at the electrical input 336 of the controller 320 and can be used by the controller 320 to determine that the connectors 326, 334 are electrically connected. Then, the controller 320 can utilize the antenna 332 for wireless communication (e.g., via the wireless module 322) based on the controller 320 determining that the connectors 326, 334 are electrically connected.

Figure 5A:
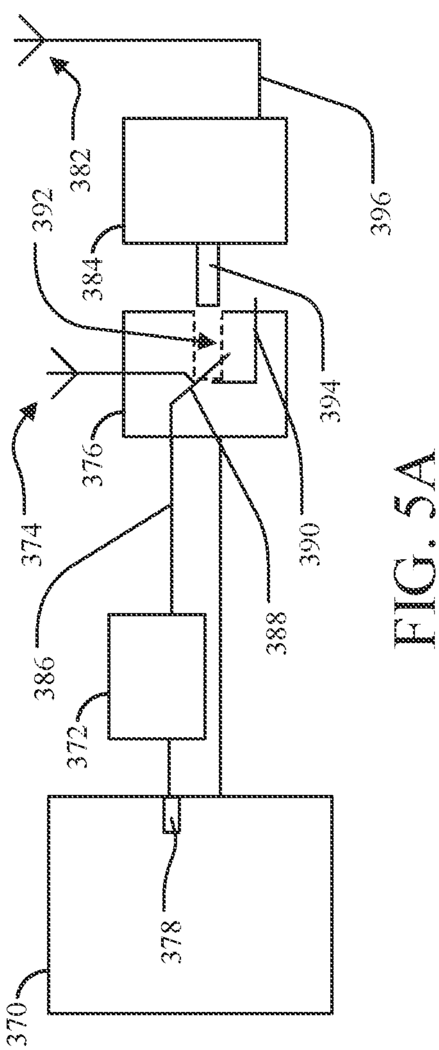
FIG. 5A is a schematic illustration of a tool that can be electrically connected and disconnected with an extender according to one embodiment of the invention in which the RF path is selectively changed when the extender is electrically connected to the tool.
Figure 5B:
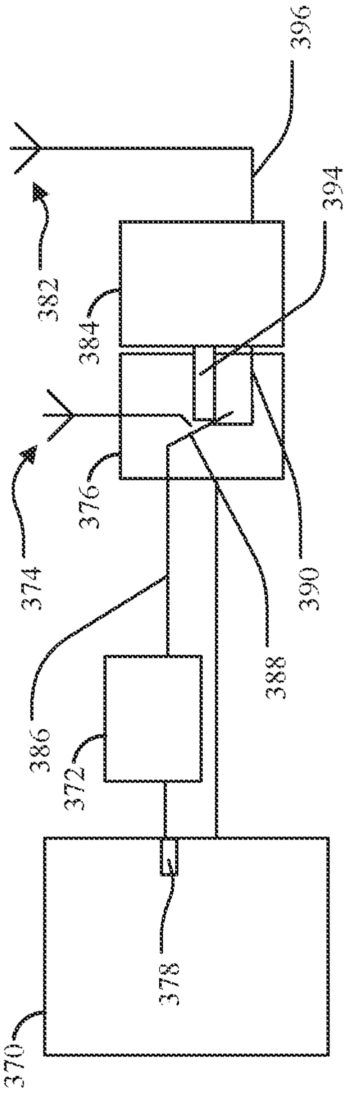
FIG. 5B is another schematic illustration of the configuration of FIG. 5A.

FIGS. 5A and 5B illustrate a tool that can be electrically connected and disconnected with an extender according to one embodiment of the invention in which an RF path is selectively changed when the extender is electrically connected to the tool. The tool can be implemented in a similar manner as the tools described previously and can include a controller 370, a wireless module 372, an antenna 374, and a connector 376, each of which can be a specific implementation of a corresponding component that has been previously described. The controller 370 is illustrated as having one electrical port 378, which can include any number of electrical inputs and outputs (e.g., pins) of the controller 370 to electrically connect the components together. For example, the electrical port 378 is electrically connected to the wireless module 372, with the electrical port 378 being used to receive and transmit signals at either the antenna 374 or an antenna 382 of the extender via the wireless module 372. Although FIG. 5A is illustrated as having only a single wireless module 372 that selectively utilizes either the antenna 374 or the antenna 382 of the extender for wireless communication (e.g., corresponding to the configuration of the tool), in other configurations, the tool can include other numbers of wireless modules and antennas as previously described (e.g., corresponding to the other wireless module configurations of FIGS. 2A-2C).

In some embodiments, the extender can also be implemented in a similar manner as the extenders described previously. For example, the extender can include an antenna 382 and a connector 384 that is electrically connected to the antenna 382. When the connectors 376, 384 are not electrically connected together, the antenna 374 is electrically connected to the wireless module 372, and the antenna 382 is electrically disconnected from the wireless module 372. However, when the connectors 376, 384 are electrically connected together (e.g., mechanically coupled together), the antenna 382 electrically connects to the wireless module 372 and the antenna 374 electrically disconnects from the wireless module 372. For example, the tool can include a wire 386 electrically connected to the wireless module 372, while the connector 376 of the tool can include an arm 388 electrically connected to the signal wire 386, an electrical pin 390, and a slot 392 that at least partially receives an arm 388. Additionally, the connector 384 can include a protrusion 394 that is configured to be inserted into the slot 392, and an RF wire 396 that is electrically connected to the antenna 382.

In some embodiments, the arm 388 is electrically conductive, and can be mechanically biased (e.g., by using a spring, such as a torsional spring) toward a first orientation in which the arm 388 is electrically connected with the antenna 374 (and electrically disconnected from the antenna 382). Thus, when the connectors 376, 384 are not electrically connected together (e.g., which is illustrated in FIG. 5A), the signal wire 386 is electrically connected to the antenna 374 so that the wireless module 372 can utilize the antenna 374 for wireless communication. However, when the connectors 376, 384 are electrically connected together (e.g., which is illustrated in FIG. 5B), the arm 388 is forced into contact with the electrical pin 390 (and away from contact with the antenna 374) by the contact between the protrusion 394, so that the mechanical arm 388 electrically connects to the electrical pin 390 (and electrically disconnects from the antenna 374). In this way, an RF path is established by an electrical connection between the signal wire 386, the mechanical arm 388, the electrical pin 390, the RF wire 396, and to the antenna 382. Thus, the wireless module 372 can transmit and receive signals at the antenna 382 when the connectors 376, 384 are electrically connected. In this way, the controller 370 does not have to determine whether the connectors 376, 384 are electrically connected to switch between utilizing the antenna 374 or the antenna 382 for wireless communication. Rather, the mechanical coupling between the connectors 376, 384 automatically switches the RF path from the wireless module 372 to either the antenna 374 or the antenna 382.

Figure 6:
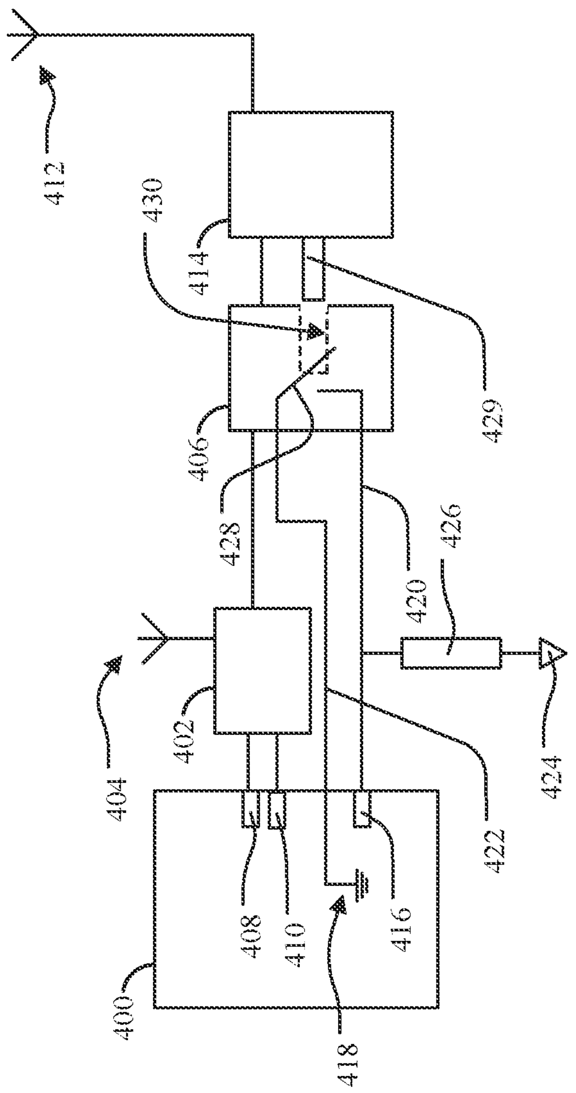
FIG. 6 is a schematic illustration of a tool that can be electrically connected with an extender according to one embodiment of the invention in which the tool can determine that the extender is electrically connected to the tool.

FIG. 6 illustrates a tool that can be electrically connected and disconnected with an extender in one embodiment of the invention in which the controller of the tool can determine that the extender is electrically connected to the tool. The tool can be implemented in a similar manner the tools described previously and can include a controller 400, a wireless module 402, an antenna 404, and a connector 406, each of which can be a specific implementation of a corresponding component that has been previously described. The controller 400 is illustrated as having at least two electrical ports 408, 410, which can include any number of electrical inputs and outputs (e.g., pins) of the controller 400 to electrically connect the components together. For example, both the electrical ports 408, 410 are electrically connected to the wireless module 402, with the electrical port 408 being used to receive and transmit signals at the antenna 404 (e.g., via the wireless module 402), and with the electrical port 410 being used to receive and transmit signals at an antenna 412 of the extender (e.g., via the wireless module 402). Although FIG. 6 is illustrated as having only a single wireless module 402 that selectively utilizes either the antenna 404 or the antenna 412 of the extender for wireless communication (e.g., corresponding to the configuration of the tool), in other configurations, the tool can include other numbers of wireless modules and antennas as previously described (e.g., corresponding to the other wireless module configurations of FIGS. 2A-2C).

In some embodiments, the extender can also be implemented in a similar manner as the extenders described previously. For example, the extender can include the antenna 412 and a connector 414 that is electrically connected to the antenna 412. When the connectors 406, 414 are electrically connected together (e.g., mechanically coupled together), the antenna 412 electrically connects to the wireless module 402 so that the controller 400 can utilize the antenna 412 for wireless communication. As illustrated in FIG. 6, the tool can also include a sensor (e.g., a sensor of the one or more sensors 118 of the tool 102), which can be electrically connected to the controller 400, and can be configured to sense the presence of the connector 414, or the engagement between the connectors 406, 414 (e.g., via the engagement between the respective coupling features of the connectors). In some embodiments, this sensor can be collectively defined by multiple components. For example, the controller 400 can include an electrical input 416, a ground connection 418 (e.g., a ground pin), a wire 420 electrically connected to the electrical input 416 and the connector 406, and a wire 422 electrically connected to the ground connection 418 and the connector 406. Additionally, the tool can also include a power supply 424 (e.g., a 5V power supply), and a load 426 (e.g., a resistor) electrically connected between the wire 420 and the power supply 424.

As illustrated in FIG. 6, the connector 406 also includes an arm 428 that is electrically conductive. The arm 428 is electrically connected to the wire 422 and can be mechanically biased towards a first orientation in which the arm 428 is not electrically connected with the ground connection 418. Thus, when the connectors 406, 414 are not electrically connected together (e.g., which is illustrated in FIG. 6) the electrical input 416 receives a voltage that is substantially equal to the voltage of the power supply 424. Thus, the controller 400 can determine that the connectors 406, 414 are electrically connected, based on the controller 400 receiving this voltage at the electrical input 416. However, when the connectors 406, 414 are electrically connected, the arm 428 is forced toward and into contact with the electrical wire 420 (e.g., by the protrusion 429 of the connector 414 being inserted into the slot 430, contacting and thus moving the arm 428), so that the arm 428 electrically connects to wire 420 thereby delivering a ground signal to the electrical input 416. In this way, the controller 400 can determine that the connectors 406, 414 are electrically connected together, based on a ground signal being received at the electrical input 416, and thus the controller 400 can receive and transmit signals at the antenna 412 (e.g., via the wireless module 402).

In other configurations, the connector 414 can include a magnetic component (e.g., the protrusion 429 can be formed out of a magnetic material). Correspondingly, the arm 428 can also be formed out of a magnetic material. In this way, as the magnetic component of the connector 414 is brought closer to the connector 406 (e.g., the connectors 406, 414 are coupled together), the magnetic component can repel the arm 428 so that the arm 428 contacts the wire 420 (e.g., the arm 428 electrically connects to the wire 420). Thus, when the connectors 406, 414 are coupled together, the arm 428 can be moved without a component (e.g., the protrusion 429) physically contacting the arm 428. In some cases, this configuration can be utilized for the other configurations described herein (e.g., the configuration of FIG. 6). For example, the arm 428, in general, can electrically connect an electrical input to an electrical output, or an electrical input to an electrical ground (or a power source, a power supply, etc.). As a more specific example, the arm 428 can electrically connect the electrical input 296 to the electrical output 298, the arm 428 can electrically connect the ground connection 338 to the electrical input 336, etc.

Figure 7:
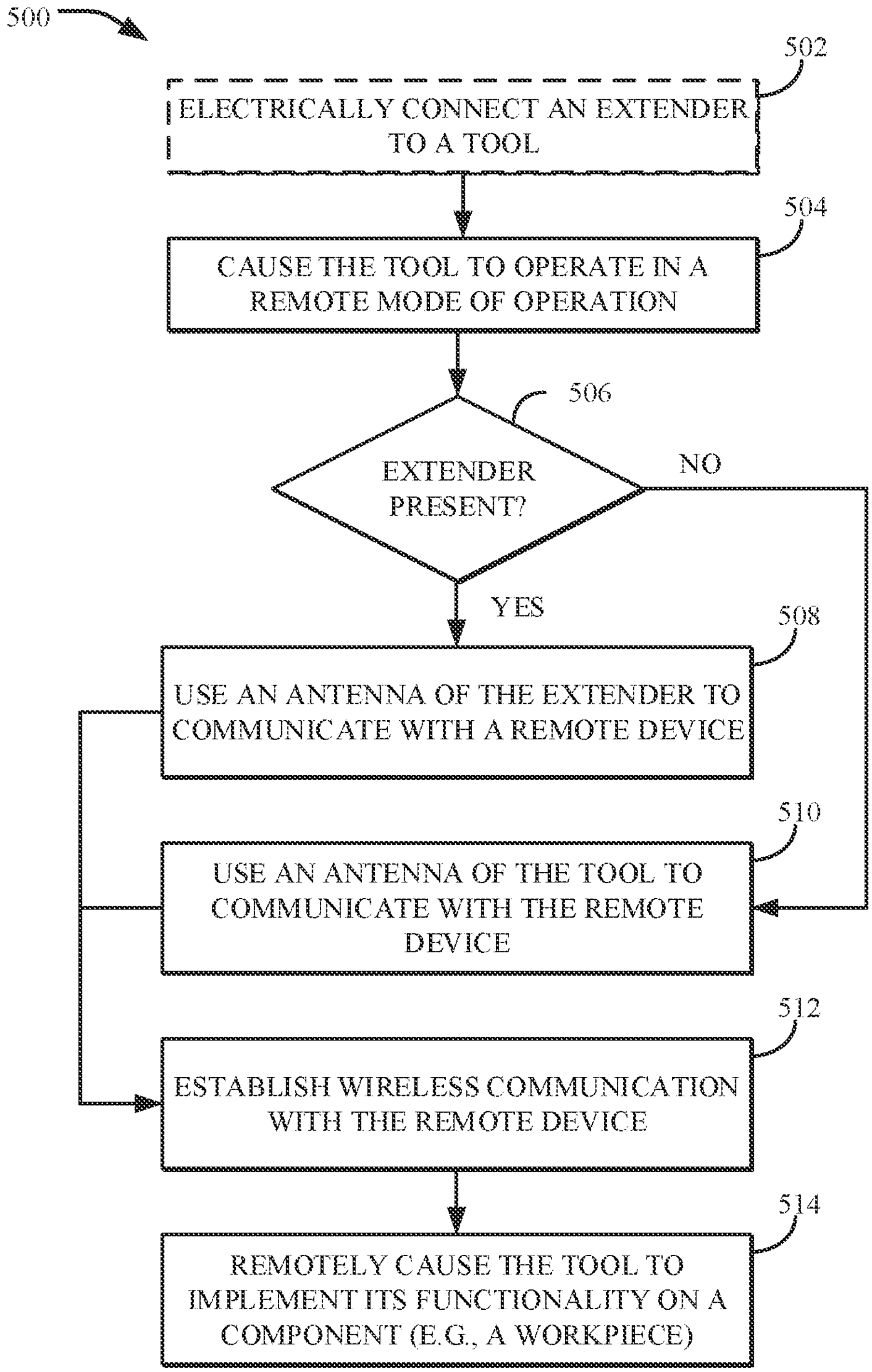
FIG. 7 is a flowchart of a process for extending the communication distance of a tool according to one embodiment of a method of the invention.

FIG. 7 shows a flowchart of a process 500 for extending the communication distance of a tool, which can be implemented using any of the previously described tools, remote devices, and extenders, as appropriate, using one or more computing devices (e.g., the controller of the tool).

At 502, the process 500 can include electrically connecting an extender to a tool, which can include mechanically coupling the extender to the tool. For example, this can include mechanical coupling (and electrically connecting) the connector of the extender to the connector of the tool. In particular, mechanically coupling the connectors together can include engaging a coupling feature of the connector of the extender with a coupling feature of the connector of the tool. In some embodiments, this can include inserting a protrusion of the connector of the extender into a slot of the connector of the tool to switch the orientation of an arm. In some configurations, this can include electrically connecting an antenna of the extender to a tool. In addition, this can include electrically connecting a wireless module of the extender (e.g., that includes the antenna) to the tool, or electrically connecting a wireless module of the tool to the antenna of the extender.

In some embodiments, the block 502 can include unraveling and lengthening an electrical cable of the extender. For example, the antenna (and the corresponding wireless module) of the extender can be placed in a desired location. For example, the antenna of the extender can be placed outside of a vault (e.g., above a below-ground cavity). In particular, the antenna of the extender can be positioned above ground (e.g., outside of a hole in the ground), while the tool can be positioned below ground (e.g., within the hole in the ground). Correspondingly, the workpiece can also be positioned below ground (e.g., also within the hole in the ground). As a more specific example, the workpiece can be an underground wire, and the tool can implement a functionality on the workpiece, which can be cutting the underground wire. In some cases, a remote device can be positioned above ground (e.g., outside of the hole in the ground).

At 504, the process 500 can include a computing device (e.g., the controller of the tool) causing the tool to operate in a remote mode of operation. For example, in the remote mode of operation, the tool can prevent implementing the functionality (e.g., on a workpiece) by, for example, disabling the trigger. In this case, the computing device can receive an indication that the trigger of the tool has been actuated, but the computing device can cause the tool not to implement the functionality. In some cases, in the remote mode of operation, the computing device can cause the tool to implement the functionality on the workpiece in response to (e.g., or only in response to) receiving a wireless signal (e.g., from the remote device). In some cases, the block 504 can include a computing device switching from a normal mode of operation and to the remote mode of operation. For example, in the normal mode of operation of the tool, actuation of the trigger of the tool can cause the tool to implement the functionality on the workpiece.

At 506, the process 500 can include a computing device determining whether or not the extender is electrically connected to the tool. In some embodiments, this determination can be based on the computing device receiving sensor information from a sensor. For example, a computing device can receive sensor information from a sensor (e.g., coupled to the tool), and the computing device can determine that the extender is electrically connected to the tool, based on the sensor information exceeding a threshold (or the sensor information being within the threshold). For example, when the sensor information is an RF signal, the computing device can determine that the extender is electrically connected to the tool, based on the RF signal being greater than the threshold. As another example, when the sensor information is optical information (e.g., the sensor is an optical sensor, such as, for example, a photodetector), the computing device can determine that the extender is electrically connected to the tool, based on the optical information being below the threshold (e.g., indicating that the connectors that are coupled together have blocked the ambient light from reaching the optical sensor). Correspondingly, the computing device can determine that the extender is electrically disconnected to the tool, based on the sensor information exceeding the threshold (or the sensor information being within the threshold). For example, when the sensor information is optical information, the computing device can determine that the extender is electrically disconnected from the tool, based on the optical data being greater than the threshold (e.g., indicating that the connectors are not coupled together and ambient light can reach the optical sensor). As another example, when the sensor information is a signal (e.g., a ground signal, a voltage signal, etc.), the computing device can determine that the extender is electrically disconnected from the tool, based on the signal being within a threshold (e.g., the electrical input of the controller receiving substantially a ground signal, indicating that the wire of the connector has grounded out a pull up resistor).

In some embodiments, the block 506 can include a computing device receiving a signal indicative of the extender being electrically connected to the tool (e.g., the connectors being coupled together), and the computing device can determine that the extender is electrically connected to the tool, based on the presence of the signal (e.g., a ground signal at the electrical input, a 5V signal at the electrical input, etc.). Correspondingly, the computing device can determine that the extender is electrically disconnected from the tool, based on the computing device failing to receive the signal indicative of the extender being electrically connected to the tool, within, for example, a period of time (e.g., 2 minutes).

If at the block 506, a computing device determines that the extender is electrically connected to the tool, the process 500 can proceed to block 508. If, however, at the block 506 the computing device determines that the extender is electrically disconnected from the tool, the process 500 can proceed to the block 510 of the process 500.

At 508, the process 500 can include a computing device (e.g., the controller of the tool) using the antenna of the extender to communicate with a remote device. For example, this can include the computing device routing an RF signal to the antenna of the extender (e.g., the antenna external to the tool, which can include the antenna being positioned outside of the body of the tool). In some cases, this can include disabling the antenna for wireless communication (e.g., temporarily), in which the antenna is coupled to the body of the tool and is positioned within the internal volume of the body of the tool.

At 510, the process 500 can include a computing device (e.g., the controller of the tool) using the antenna of the tool (e.g., that is coupled to the body of the tool and is positioned within the internal volume of the body of the tool) to communicate with the remote device. For example, this can include the computing device routing an RF signal to the antenna of the tool (e.g., the antenna internally inside the tool).

As shown in FIG. 7, after each of the blocks 508, 510 have been completed, the process 500 can proceed to the block 512. At the block 512, the process 500 can include a computing device (e.g., the controller of the tool) establishing wireless communication (e.g., bidirectional communication) with the remote device. For example, this can include a computing device establishing wireless communication with the remote device, using the antenna of the extender (e.g., and not using the antenna of the tool that is positioned within the body of the tool). As another example, this can include a computing device establishing wireless communication with the remote device using the antenna of the tool. In some configurations, this can include establishing a wireless communication channel (according to a Bluetooth® wireless protocol) between the remote device (e.g., a remote control) and the extender, while in other cases, this can include establishing a wireless communication channel (according to a Bluetooth® wireless protocol) between the remote device and the tool. In some embodiments, this can also include establishing a wired communication channel between the extender and the tool.

At 514, the process 500 can include a computing device (e.g., the controller of the tool) remotely causing the tool (e.g., the actuator of the tool) to implement a functionality on a component such as a workpiece (e.g., situated in the path of the moveable component of the tool). In some configurations, such as when the tool is using the antenna of the extender to communicate, the remote device (e.g., the remote control) can cause the tool to implement the functionality on the workpiece, via the extender. For example, the remote device can transmit a message to the extender, which can be received by the antenna of the extender and can be directed to the controller of the tool. When the message is received by the controller of the tool, using the antenna of the extender, the controller can cause the tool to implement the functionality on the workpiece.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, aspects of the invention, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g. "one or the other but not both") when preceded by terms of exclusivity, such as "either," "one of," "only one of" or "exactly one of."

Various features and advantages of the disclosure are set forth in the following claims.

The invention claimed is:

1. A tool comprising:

a controller;

a first connector configured to be removably coupled to a second connector of an extender having a first antenna, when the first connector is coupled to the second connector, the first antenna of the extender electrically connects to the tool, the controller configured to wirelessly communicate with a remote device using the first antenna;

a second antenna in communication with the controller; and a sensor in communication with the controller;

the controller being configured to:

determine that the extender is electrically connected to the tool, based on information received from the sensor;

cause the tool to wirelessly communicate with the remote device using the first antenna of the extender, based on determining that the extender is electrically connected to the tool; and cause the tool to implement a functionality on a workpiece, based on the wireless communication between the remote device and the tool, via the first antenna.

2. The tool of claim 1, wherein at least one of:

the first connector is a male connector and the second connector is a female connector; or the first connector is a female connector and the second connector is a male connector.

3. The tool of claim 1, wherein the workpiece is an underground wire and the functionality performed on the workpiece is cutting the underground wire; and wherein the extender is configured to be positioned above ground.

4. A tool system configured to implement a functionality on a workpiece, the tool system comprising:

a tool;

a controller;

a sensor in communication with the controller; and a connector configured to be removably coupled an electrical cable of an extender having a first antenna;

when the connector is coupled to the electrical cable, the first antenna electrically connects to the tool, and the controller is configured to:

determine that the extender is electrically connected to the tool, based on information received from the sensor;

cause the tool to operate in a first mode of operation in which the tool uses the first antenna of the extender to wirelessly communicate with a remote device, based on determining that the extender is electrically connected to the tool; and while the tool operates in the first mode of operation, cause the tool to implement the functionality on the workpiece, based on the wireless communication between the remote device and the tool, via the first antenna.

5. The tool system of claim 4, further comprising a second antenna coupled to and positioned within the body, the second antenna in communication with the controller, and wherein when the tool operates in the first mode of operation, the first antenna of the extender is used rather than the second antenna to wirelessly communicate with the remote device.

* * * * *